US010266187B2

(12) United States Patent
Fortin et al.

(10) Patent No.: US 10,266,187 B2
(45) Date of Patent: Apr. 23, 2019

(54) SYSTEM AND METHOD FOR PROVIDING RAILWAY WORKER SAFETY VIA MULTIPLE RADIOS

(71) Applicant: HARSCO TECHNOLOGIES LLC, Fairmont, MN (US)

(72) Inventors: Eric Fortin, Fairmont, MN (US); Mike Zampini, Fairmont, MN (US); Carl Cowley, Fairmont, MN (US); Daniel Farris, Fairmont, MN (US); Jim Resio, Fairmont, MN (US)

(73) Assignee: HARSCO TECHNOLOGIES LLC, Fairmont, MN (US)

( * ) Notice: Subject to any disclaimer, the term of this patent is extended or adjusted under 35 U.S.C. 154(b) by 0 days.

(21) Appl. No.: 15/836,513

(22) Filed: Dec. 8, 2017

(65) Prior Publication Data
US 2018/0162428 A1 Jun. 14, 2018

Related U.S. Application Data

(60) Provisional application No. 62/431,916, filed on Dec. 9, 2016.

(51) Int. Cl.
*B61L 23/06* (2006.01)
*G08B 21/02* (2006.01)
(Continued)

(52) U.S. Cl.
CPC ........... *B61L 23/06* (2013.01); *B61L 15/0027* (2013.01); *G08B 21/02* (2013.01); *H04W 4/90* (2018.02);
(Continued)

(58) Field of Classification Search
CPC .... B61L 15/0027; B61L 25/021; B61L 23/06; B61L 27/0005; G08B 25/016
See application file for complete search history.

(56) References Cited

U.S. PATENT DOCUMENTS

2007/0106518 A1  5/2007  Wildman et al.
2010/0260094 A1* 10/2010  Gruber .................. H04W 36/18
                                                                370/315
(Continued)

FOREIGN PATENT DOCUMENTS

WO    2015126110 A1    8/2015

OTHER PUBLICATIONS

International Search Report for PCT/US2017/065395 dated Jul. 26, 2018.

*Primary Examiner* — Hongmin Fan
(74) *Attorney, Agent, or Firm* — Baker & McKenzie LLP

(57) ABSTRACT

Systems and methods for alerting rail workers of an oncoming rail vehicle are described. The system and method provide for a vehicle alert device on a rail vehicle. The vehicle alert device has two radios operating at different frequencies. Further provided is a personal alert device worn by a rail worker. The personal alert device has two radios operating at different frequencies. The frequencies of the radios in the vehicle alert device and of the radios in the personal alert device correspond to one another. One of the radios in the vehicle alert device and one of the radios in the personal alert device operate on the same frequency and perform ranging functions. The other radio in the vehicle alert device and the other radio in the personal alert device operate at the same frequency and provide for data communication between the rail worker and the rail vehicle.

19 Claims, 5 Drawing Sheets

(51) Int. Cl.
    *H04W 4/90*           (2018.01)
    *B61L 15/00*          (2006.01)
    *G01S 19/01*          (2010.01)
    *G08B 21/22*         (2006.01)

(52) U.S. Cl.
    CPC ........... *B61L 2205/02* (2013.01); *G01S 19/01* (2013.01); *G08B 21/22* (2013.01)

(56) References Cited

U.S. PATENT DOCUMENTS

| | | |
|---|---|---|
| 2011/0006912 A1 | 1/2011 | Sheardown et al. |
| 2013/0166114 A1 | 6/2013 | Baines et al. |
| 2016/0280240 A1 | 9/2016 | Carlson et al. |
| 2017/0282944 A1* | 10/2017 | Carlson ............... B61L 15/0027 |
| 2018/0093687 A1* | 4/2018 | Bartek ................... B61L 23/06 |

\* cited by examiner

SYSTEM AND METHOD FOR PROVIDING RAILWAY WORKER SAFETY VIA MULTIPLE RADIOS

CROSS-REFERENCE TO RELATED APPLICATIONS

This application claims priority to U.S. Provisional App. Ser. No. 62/431,916, filed on Dec. 9, 2016, which is hereby incorporated by reference in its entirety.

BACKGROUND

Railroads are typically constructed to include a pair of elongated, substantially parallel rails, which are coupled to a plurality of laterally extending ties. The ties are disposed on a ballast bed of hard particulate material, such as gravel. Over time, normal wear and tear on the railroad may require track maintenance operations to correct rail deviations. Exemplary rail maintenance operations include ballast tamping, spike pulling, spike driving, anchor spreading, anchor squeezing, track stabilizing, crib booming and tie extracting. Such maintenance operations often require rail workers to operate on or near track, thus presenting safety concerns when operating on live track, i.e., track that is used by independent rail vehicles.

Live track presents a safety concern when a rail vehicle approaches rail workers operating on the track. Conventional rail safety systems have heretofore used a radio for communicating between rail vehicles operating on live track and rail workers operating on the live track. The typical implementation in the past is to use a 900 MHz radio for communication. That is, the rail vehicle communicates with rail workers via its 900 MHz radio that it is operating on the track. By receiving this communication, the rail workers are alerted to the rail vehicle's presence and are able to move to safety and allow the rail vehicle to pass. In this implementation, the rail workers also use a 900 MHz radio to communicate to the rail vehicle that there are rail workers in the area. The problem with conventional systems, however, is that precise distance measurements between the rail vehicle and the workers are not provided. Accordingly, there are inefficiencies with respect to the amount of time the workers are removed from the track. For example, communication between the rail vehicle and the workers may take place well in advance of when the rail vehicle actually presents a safety concern for the workers. Accordingly, improved methods for providing for the safety of such rail workers, while also improving work efficiency such as through the use of precise distance measurements, are thus desired.

BRIEF SUMMARY

The present disclosure generally relates to the use of multiple radios for providing railway safety for rail workers. Rail workers may use personal alert devices ("PADs") that can be worn by the workers, such as on arm bands. The PADs include two separate radios—one operating at 900 MHz for data communication and another operating on 2.4 GHz for performing ranging functions. Rail vehicles operating on live track also include two separate radios operating at 900 MHz and 2.4 GHz, respectively. In this manner, the 900 MHz radios can be used for data communication, such as the transmission of alerts to/from the workers and the rail vehicles. The 2.4 GHz radios can be separately used for ranging, thereby giving precise measurements as to the distance between the rail vehicle and the workers. Further, the provision of two radios for the workers and the rail vehicles provides for redundancy should one of the radios fail. Indeed, the 2.4 GHz radios may also be used for data communication. Related methods are described. In some embodiments, the 900 MHz radio may be replaced with an 868 MHz radio. More generally, the 900 MHz radio and 868 MHz radios may be adapted to any country specific ASM (Academic, Scientific, Measurement) low ~900 MHz frequency band.

In additional embodiments, a Global Positioning System ("GPS") may be used in conjunction with the radios to provide a secondary ranging function. The GPS may be provided both on the PADs and on the rail vehicles to further provide precise measurements of distance. Related methods are described.

BRIEF DESCRIPTION OF THE DRAWINGS

Reference is now made to the following descriptions taken in conjunction with the accompanying drawings.

DETAILED DESCRIPTION

Various embodiments of a railway worker safety system using multiple radios and related methods according to the present disclosure are described. It is to be understood, however, that the following explanation is merely exemplary in describing the devices and methods of the present disclosure. Accordingly, several modifications, changes and substitutions are contemplated.

Figure 1:
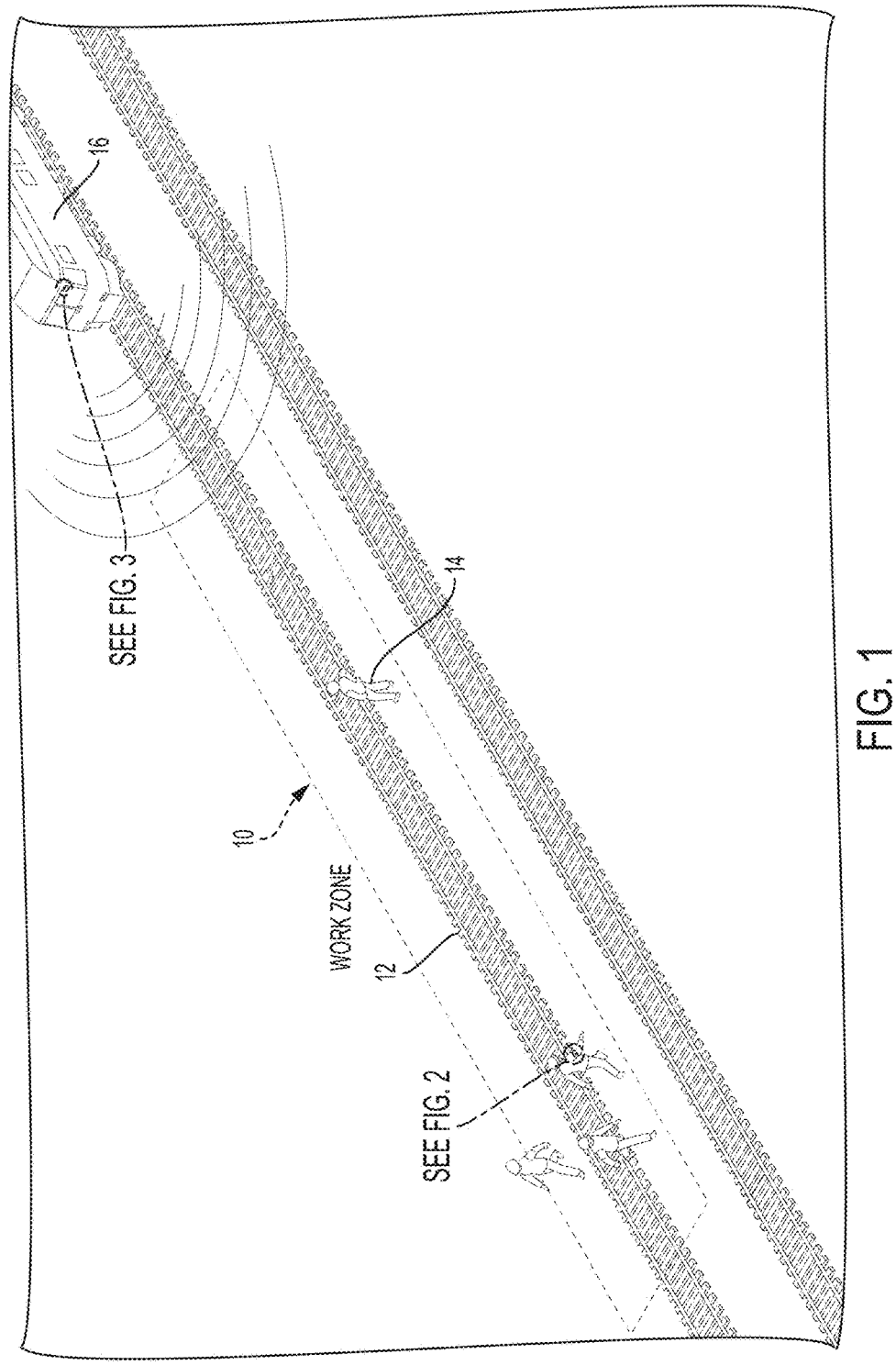
FIG. 1 illustrates a perspective view of rail workers in a work zone on live track and an approaching rail vehicle.

Referring to FIG. 1, a work zone in which rail workers perform maintenance services or other rail operations is generally depicted having reference numeral 10. The work zone 10 is defined along a live track 12. The term "live track" refers to the track being in use for commercial passenger or freight rail traffic, thus presenting higher risk with respect to accidents involving rail workers 14 operating in the work zone 10. In this regard, FIG. 1 illustrates a rail vehicle 16 approaching the work zone 10. The rail vehicle 16 may be a passenger train, such as a commuter train, traveling along the live track, or it may be freight train carrying goods. The present disclosure addresses the disadvantages of presently available railway safety systems by adding a second set of radios for use in railway safety when such trains approach a work zone, such as the work zone 10 in FIG. 1. In one embodiment, each of the rail workers 14 and the rail vehicle 16 has two separate radios—one operating at 900 MHz and the other operating at 2.4 GHz—for providing for communication supporting railway safety as will be described.

Figure 2:
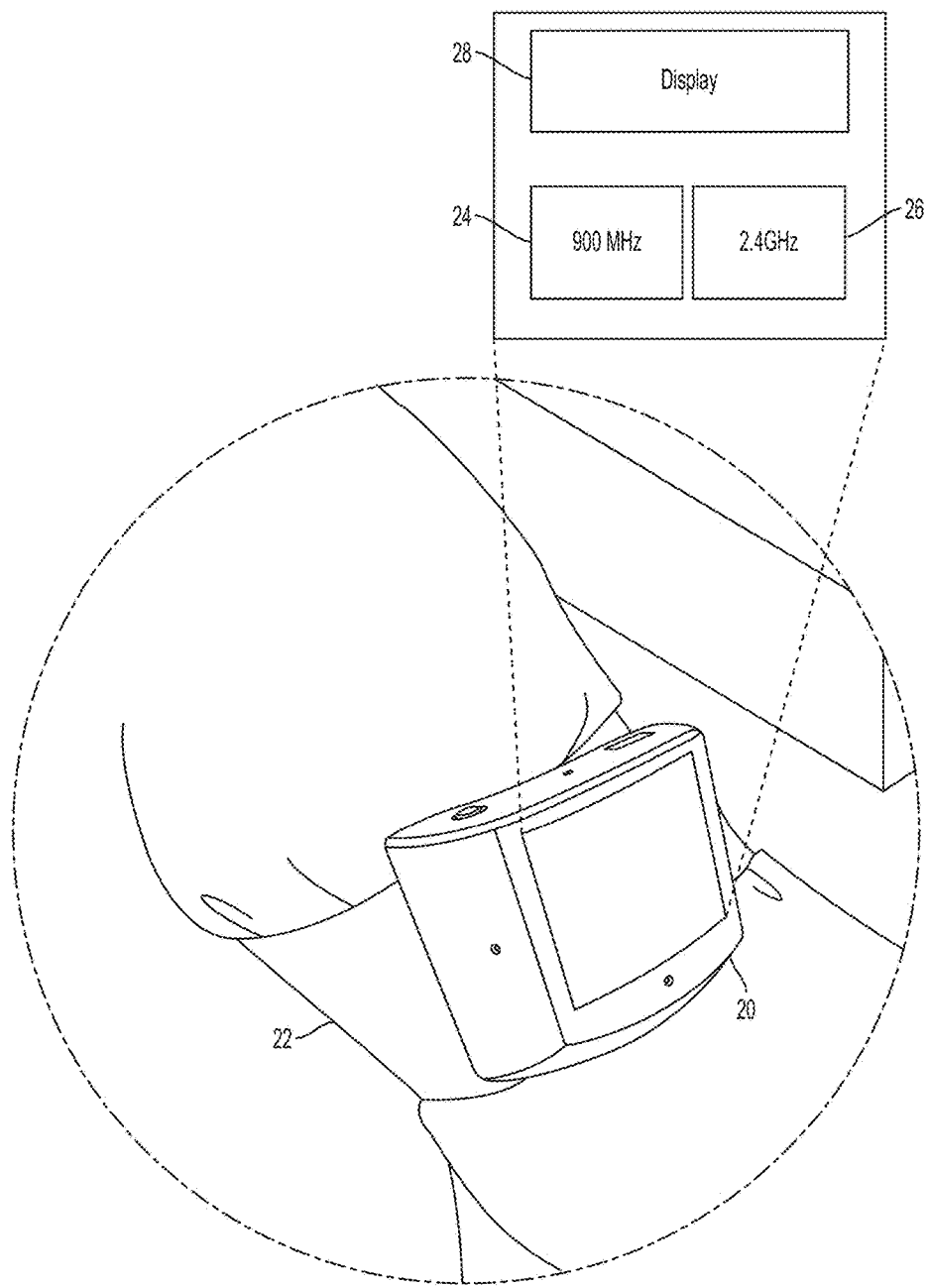
FIG. 2 illustrates a personal alert device of one of the rail workers of FIG. 1.

Referring to FIG. 2, the radios utilized by the rail worker 14 may be provided in a personal alert device ("PAD") 20 that is secured to the worker, such as via an armband 22. The PAD 20 includes a 900 MHz radio—referred to by reference numeral 24—which may be used for data communication between the rail workers 14 and the rail vehicle 16. The PAD 20 further includes a separate 2.4 GHz radio—referred to by reference numeral 26—that is used primarily for performing ranging functions. The PAD 20 may further include a display 28 for displaying data communication, visual alerts and the like. In some embodiments, the 900 MHz radio may be replaced with an 868 MHz radio or may be adapted to any country specific ASM low ~900 MHz frequency band.

Figure 3:
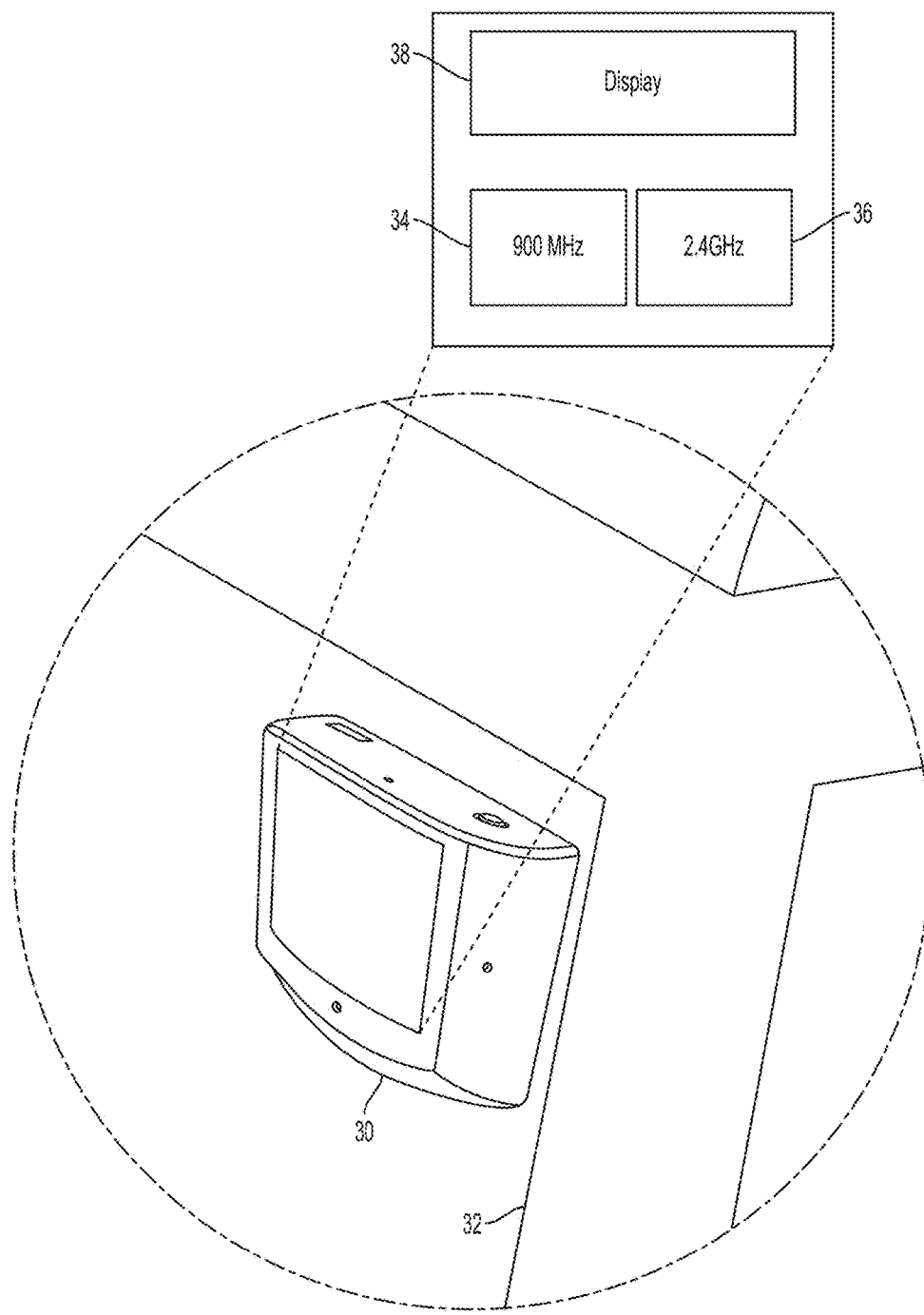
FIG. 3 illustrates an alert device of the rail vehicle of FIG. 1.

Referring to FIG. 3, a vehicle alert device 30 may also be positioned on the rail vehicle 16, such as in proximity to an operator of the rail vehicle. In one embodiment, the vehicle alert device 30 is coupled to a panel 32 in an operator cabin of the rail vehicle 16. Similar to the PAD 20, the vehicle alert device 30 includes a 900 MHz radio—referred to by reference numeral 34—which may be used for data communication between the rail workers 14 and the rail vehicle 16. The vehicle alert device 30 further includes a separate 2.4 GHz radio—referred to by reference numeral 36—that is used primarily for performing ranging functions. And similar to the PAD 20, the vehicle alert device 30 may further include a display 38 for displaying data communication, visual alerts and the like.

With the arrangement of the PAD 20 and the vehicle alert device 30, alerts can be communicated back and forth between the rail workers 14 and the rail vehicle 16 using the 900 MHz radios. The alerts may take the form of visual alerts and/or textual communications, and may appear on the displays 28, 38 associated with the PAD 20 and vehicle alert device 30, respectively. In one example, an operator of the rail vehicle 16 may visually identify rail workers 14 operating on the track ahead of the rail vehicle. According to the present disclosure, the operator of the rail vehicle 16 may communicate with the rail workers 14 via the 900 MHz radio to warn the rail workers of the oncoming rail vehicle.

While the aforementioned radio communication via the 900 MHz radio is contemplated, the present disclosure further provides for the use of the separate 2.4 GHz radios 26, 36 that may be used to perform ranging functions. Provision of the 2.4 GHz radios on both the rail workers 14 and rail vehicle 16 enables precise distance measurements between the rail vehicle 16 and the rail workers 14. These precise distance measurements may be communicated to the rail workers 14 and the rail vehicle 16 via the 900 MHz radios. In some embodiments, the precise ranging measurements may be made using 2.4 GHz chirp spread spectrum techniques. However, according to the principles of the present disclosure, the 2.4 GHz radios may also operate for data communication, thus providing redundancy should the 900 MHz radios fail. In this manner, the 2.4 GHz radios provide for full functionality if the 900 MHz radios and/or the GPS (discussed below) fail to operate correctly.

Moreover, it is to be appreciated that, in general, use of two separate radios provides for redundancy. Radios used for safety communication on track sometimes fail to communicate. Accordingly, by implementing the two radio solution of the present disclosure, the 900 MHz radio may still function if the 2.4 GHz radio loses connection, and vice versa.

Figure 4:
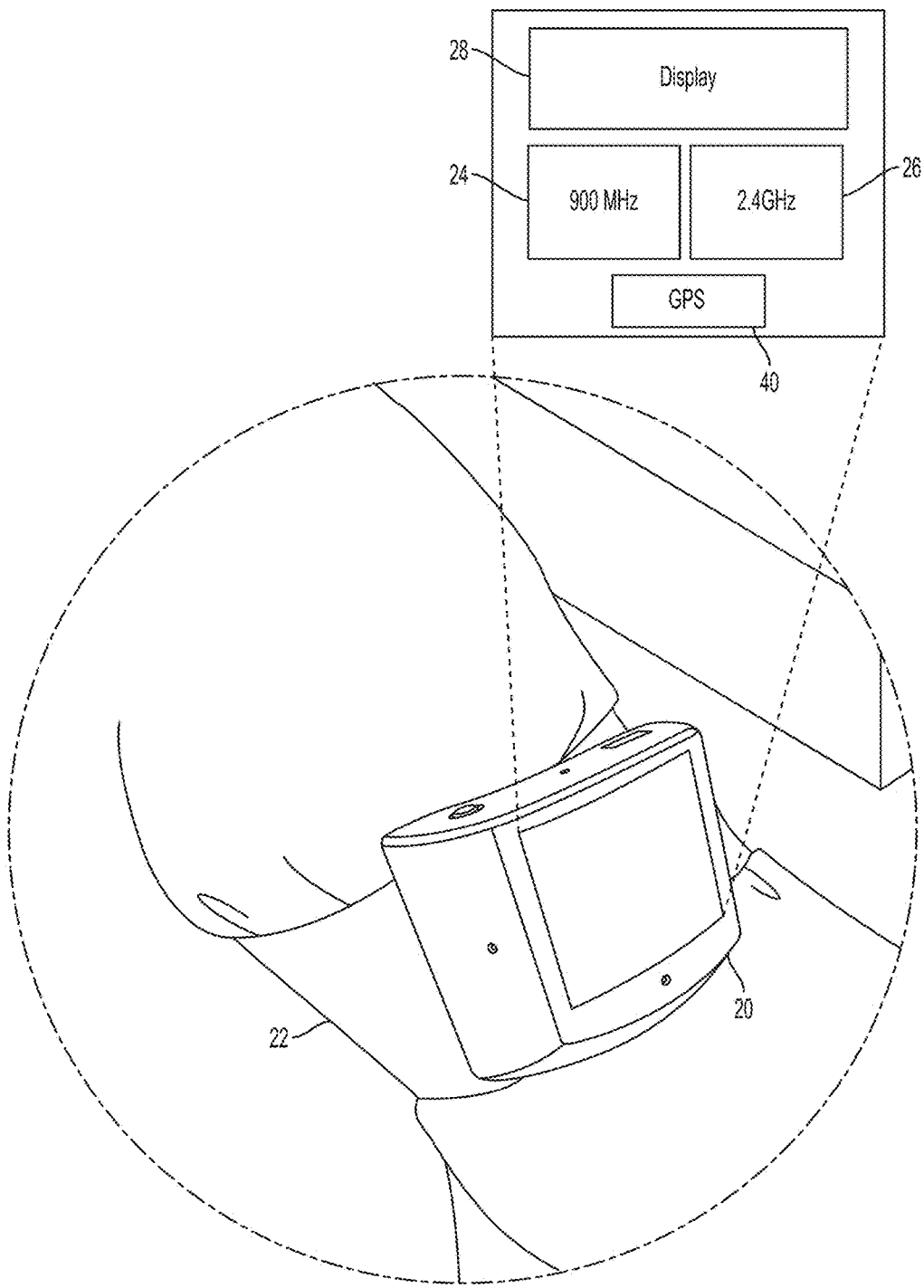
FIG. 4 illustrates an alternative personal alert device of one of the rail workers of FIG. 1.
Figure 5:
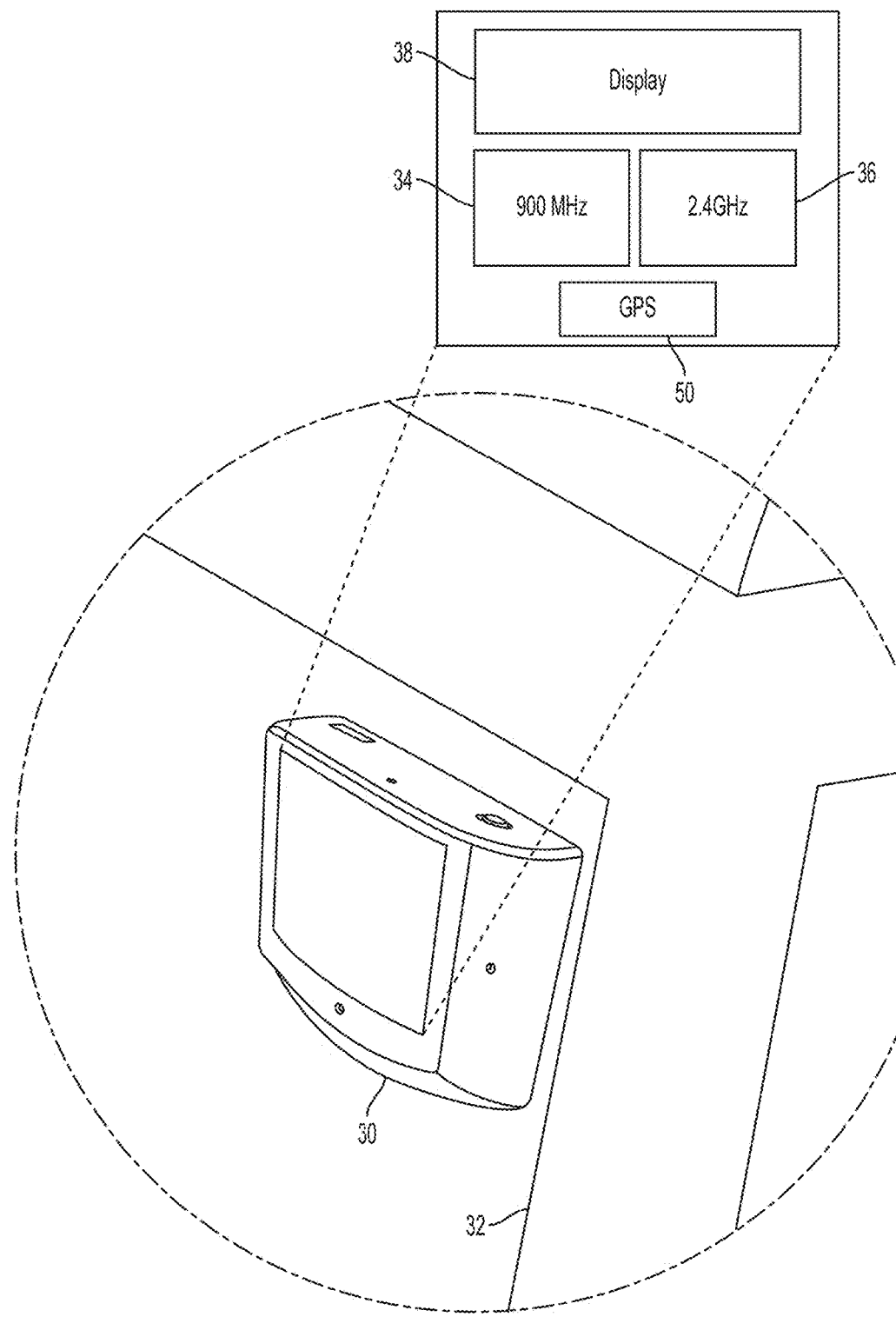
FIG. 5 illustrates an alternative alert device of the rail vehicle of FIG. 1.

In alternative embodiments, and with reference to FIGS. 4 and 5, a global positioning system ("GPS") may be utilized by the rail workers 14 and the rail vehicle 16 to provide for ranging functions, i.e. determinations of distance between the rail workers and the rail vehicle. In some embodiments, a GPS 40 utilized by the rail workers 14 may be included in the PAD 20 worn by the rail workers. In this manner, the multiple radios and GPS may be housed in a single unit. Similarly, a GPS 50 utilized by the rail vehicle may be included in the vehicle alert device 30 positioned on the rail vehicle 16.

The GPS units 40, 50 may be used to determine precise distance measurements between the rail workers 14 and the rail vehicle 16 at any point in time. The GPS units 40, 50 may thus provide a secondary ranging function, which provides further redundancy to ranging methods using the 2.4 GHz radio as contemplated by the present disclosure. In still further embodiments, ranging speed may be determined and used as a redundant form of GPS speed.

In practice, rail vehicles 16 operating on live track 12 may include the vehicle alert device 30, which performs ranging functions using the 2.4 GHz radio to determine whether there are rail workers 14 working on the track that the rail vehicle is traveling over. Should the vehicle alert device 30 detect a rail worker 14, an alert may be transmitted to the rail worker via the 900 MHz radio. To provide an additional form of rail safety, the 2.4 GHz radio operating on the PAD 20 worn by the rail worker 14 may also perform ranging functions, and thus detect the approaching rail vehicle 16. When such a rail vehicle 16 is detected, the PAD 20 worn by the rail worker 14 may transmit an alert to the rail vehicle to warn of rail workers on the track. In some embodiments, the alert may be initiated by the rail worker 14 or the operator of the rail vehicle 16. In other embodiments, alerts are automatically generated when the 2.4 GHz radio detects the presence of the rail worker 14 or rail vehicle 16.

In practice, the 2.4 GHz radios in the PAD 20 and vehicle alert device 30 may provide for data communication, which allows for redundancy should the 900 MHz radios fail or receive interference. As such, alerts may be provided between the 2.4 GHz radios of the PAD 20 and vehicle alert device 30. Still further, in embodiments where the PAD 20 and vehicle alert device 30 have GPS units 40, 50, such units may provide ranging functions, thus providing redundancy should the 2.4 GHz radios fail or receive interference. These redundant communication paths thus increase the level of safety afforded to the rail workers 14 and rail vehicles 16 operating on live track 12.

While various embodiments in accordance with the disclosed principles have been described above, it should be understood that they have been presented by way of example only, and are not limiting. For example, in some embodiments, the personal alert device need not be worn by the rail worker, but rather may be positioned proximate a work zone at a fixed site. In such embodiments, the alert device may sound an audible alarm, or may provide for alerts by way of lights and/or horns. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

What is claimed is:

1. A method for providing railway safety, comprising:
providing a vehicle alert device on a rail vehicle, the vehicle alert device having a first set of radios, the first set of radios comprising two separate radios operating at different frequencies;
providing a personal alert device on a rail worker, the personal alert device having a second set of radios, the second set of radios comprising two separate radios operating at different frequencies, and wherein the frequencies of the second set of radios correspond to the frequencies of the first set of radios;

using one of the first set of radios and one of the second set of radios that operate at the same frequency to perform a ranging function;

using the other of the first set of radios and the other of the second set of radios that operate at the same frequency to provide data communication between the rail worker and the rail vehicle, and using the radios that perform the ranging function to also provide a redundant data communication channel between the rail worker and the rail vehicle.

2. The method of claim 1, wherein one of the first set of radios and one of the second set of radios operate at a frequency of 900 MHz.

3. The method of claim 2, wherein the other radio of the first set of radios and the other radio of the second set of radios operate at a frequency of 2.4 GHz.

4. The method of claim 2, further comprising providing data communication between the rail worker and the rail vehicle using the radios operating at a frequency of 900 MHz.

5. The method of claim 3, further comprising providing ranging functions using the radios operating at a frequency of 2.4 GHz.

6. The method of claim 3, further comprising providing a redundant data communication channel via data communication between the radios operating at 2.4 GHz.

7. The method of claim 1, further comprising providing a GPS unit in the vehicle alert device, the GPS unit performing a ranging function to detect a rail worker.

8. The method of claim 1, further comprising providing a GPS unit in the personal alert device, the GPS unit performing a ranging function to detect approaching rail vehicles.

9. A system for providing railway safety, comprising:
a vehicle alert device on a rail vehicle, the vehicle alert device having a first set of radios, the first set of radios comprising two separate radios operating at different frequencies;
a personal alert device worn by a rail worker, the personal alert device having a second set of radios, the second set of radios comprising two separate radios operating at different frequencies, and wherein the frequencies of the second set of radios correspond to the frequencies of the first set of radios;
wherein one radio of the first set of radios and one radio of the second set of radios that operate at the same frequency are operable to perform a ranging function;
wherein the other radio of the first set of radios and the other radio of the second set of radios that operate at the same frequency are operable to provide for data communication between the rail worker and the rail vehicle and
wherein the radios that are operable to perform the ranging function are also operable to provide a redundant data communication channel between the rail worker and the rail vehicle.

10. The system of claim 9, wherein one radio of the first set of radios and one radio of the second set of radios operate at a frequency of 900 MHz.

11. The system of claim 10, wherein the other radio of the first set of radios and the other radio of the second set of radios operate at a frequency of 2.4 GHz.

12. The system of claim 10, wherein the radios operating 900 MHz provide for data communication between the rail worker and the rail vehicle.

13. The system of claim 11, wherein the radios operating at a frequency of 2.4 GHz provide for ranging functions.

14. The system of claim 11, wherein the radios operating at a frequency of 2.4 GHz provide for a redundant data communication channel between the rail worker and rail vehicle.

15. The system of claim 9, wherein the vehicle alert device comprises a GPS unit that provides a ranging function to detect a rail worker on the track.

16. The system of claim 9, wherein the personal alert device comprises a GPS unit that provides a ranging function to detect approaching rail vehicles.

17. A system for providing railway safety, comprising:
a vehicle alert device on a mail vehicle, the vehicle alert device having a first set of radios, the first set of radios comprising two separate radios operating at different frequencies;
a personal alert device worn by a rail worker, the personal alert device having a second set of radios, the second set of radios comprising two separate radios operating at different frequencies, and wherein the frequencies of the second set of radios correspond to the frequencies of the first set of radios;
wherein one radio of the first set of radios and one radio of the second set of radios that operate at the same frequency are operable to perform a ranging function;
wherein the other radio of the first set of radios and the other radio of the second set of radios that operate at the same frequency are operable to provide for data communication between the rail worker and the rail vehicle;
wherein the radios that are operable to perform the ranging function are also operable to provide a redundant data communication channel between the rail worker and the rail vehicle; and
wherein the personal alert device and the vehicle alert device each further comprise a GPS unit operable to perform a ranging function.

18. The system of claim 17, wherein one radio of the first set of radios and one radio of the second set of radios operate at a frequency of 900 MHz and provide for data communication between the rail worker and the rail vehicle.

19. The system of claim 18, wherein the other radio of the first set of radios and the other radio of the second set of radios operate at a frequency of 2.4 GHz and perform ranging functions.

* * * * *